(12) United States Patent
Lorenz et al.

(10) Patent No.: US 11,286,033 B2
(45) Date of Patent: *Mar. 29, 2022

(54) WING FOR AN AIRCRAFT (71) Applicant: Airbus Operations GmbH, Hamburg (DE)

(72) Inventors: Florian Lorenz, Hamburg (DE); Dennis Krey, Hamburg (DE); Bernhard Schlipf, Hamburg (DE); Dustin Shapi, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 39 days.

This patent is subject to a terminal disclaimer.

(21) Appl. No.: 16/830,590

(22) Filed: Mar. 26, 2020

(65) Prior Publication Data
US 2020/0307769 A1 Oct. 1, 2020

(30) Foreign Application Priority Data
Mar. 29, 2019 (DE) .................... 10 2019 108 285.4

(51) Int. Cl.
*B64C 9/02* (2006.01)
*B64C 3/00* (2006.01)
(Continued)

(52) U.S. Cl.
CPC ............... *B64C 9/02* (2013.01); *B64C 3/00* (2013.01); *B64C 3/187* (2013.01); *B64C 9/24* (2013.01)

(58) Field of Classification Search
CPC ............... B64C 9/02; B64C 9/22; B64C 9/24
See application file for complete search history.

(56) References Cited

U.S. PATENT DOCUMENTS 2,938,680 A * 5/1960 Greene .................... B64C 9/24
244/214
3,272,458 A 9/1966 Bracka
(Continued)

FOREIGN PATENT DOCUMENTS

CN 202 213 714 U 5/2012
CN 110546065 A 12/2019
(Continued)

OTHER PUBLICATIONS

German Search Report for Application No. 10 2019 108 285.4 dated Dec. 4, 2019.
(Continued)

*Primary Examiner* — Joshua J Michener
*Assistant Examiner* — Arfan Y. Sinaki
(74) *Attorney, Agent, or Firm* — Jenkins, Wilson, Taylor & Hunt, P.A.

(57) ABSTRACT

A wing for an aircraft including a main wing, slat, and connection assembly movable connecting the slat to the main wing and including an elongate slat track. A front end of the slat track is mounted to the slat. A rear end and an intermediate portion of the slat track are mounted to the main wing by a roller bearing that includes a guide rail mounted to the main wing and a first roller unit mounted to the rear end of the slat track and engaging the guide rail. The wing has redundant main load paths. The guide rail includes a guide rail primary structure engaging with the first roller unit and an additional reinforcement structure additionally reinforcing the guide rail primary structure in a lateral direction. The guide rail primary structure forms a first main load path. The reinforcement structure forms a redundant second main load path.

12 Claims, 5 Drawing Sheets

(51) Int. Cl.
  *B64C 3/18* (2006.01)
  *B64C 9/24* (2006.01)

(56) References Cited

U.S. PATENT DOCUMENTS

| | | | |
|---|---|---|---|
| 4,360,176 | A | 11/1982 | Brown |
| 4,471,928 | A | 9/1984 | Cole |
| 4,687,162 | A * | 8/1987 | Johnson ............... B64C 9/24 244/213 |
| 5,039,032 | A * | 8/1991 | Rudolph ............... B64C 23/069 244/35 R |
| 5,544,847 | A | 8/1996 | Bliesner |
| 8,292,235 | B2 | 10/2012 | Wollaston et al. |
| 8,511,619 | B2 | 8/2013 | Mann |
| 9,016,636 | B2 | 4/2015 | Parker |
| 10,053,237 | B2 | 8/2018 | Huang et al. |
| 2007/0102587 | A1 | 5/2007 | Jones et al. |
| 2009/0127402 | A1 | 5/2009 | Jaggard et al. |
| 2015/0090843 | A1 | 4/2015 | Guering |
| 2016/0096615 | A1 | 4/2016 | Wilson et al. |
| 2018/0312243 | A1 | 11/2018 | Vervliet et al. |
| 2020/0122819 | A1 | 4/2020 | Schlipf et al. |
| 2020/0148331 | A1 | 5/2020 | Bensmann |
| 2021/0163121 | A1 | 6/2021 | Schlipf et al. |
| 2021/0300523 | A1 | 9/2021 | Krey et al. |

FOREIGN PATENT DOCUMENTS

| | | | | |
|---|---|---|---|---|
| CN | 110573422 | A | 12/2019 | |
| EP | 2 316 727 | A1 | 5/2011 | |
| EP | 3 176 076 | A1 | 6/2017 | |
| EP | 3 718 881 | A1 | 10/2020 | |
| GB | 298508 | A * | 10/1928 | ............... B64C 9/24 |
| GB | 404 149 | A | 1/1934 | |
| GB | 1 492 177 | A | 11/1977 | |
| GB | 1 572 004 | A | 7/1980 | |
| GB | 1572004 | A * | 7/1980 | ............... B64C 9/24 |
| GB | 2 204 538 | A | 11/1988 | |
| GB | 2 458 683 | A | 9/2009 | |
| JP | 2011/515277 | A | 5/2011 | |
| JP | 2012/501895 | A | 1/2012 | |
| JP | 2020/517521 | A | 6/2020 | |
| JP | 2020/517524 | A | 6/2020 | |
| JP | 6840893 | B2 | 3/2021 | |
| RU | 2497717 | C2 | 11/2013 | |
| WO | WO 2009/118547 | A2 | 10/2009 | |
| WO | WO 2010/026410 | A2 | 3/2010 | |
| WO | WO 2018/197265 | A1 | 11/2018 | |
| WO | WO 2018/197649 | A1 | 11/2018 | |

OTHER PUBLICATIONS

European Search Report for Application No. 20165074.4 dated Sep. 4, 2020.
German Search report for Application No. 10 2017 123 701.1 dated Feb. 27, 2018.
German Search Report for Application No. 10 2017 124 793.9 dated Feb. 27, 2018.
International Search Report and Written Opinion for Application No. PCT/EP2018/059763 dated Jun. 18, 2018.
International Search Report and Written Opinion for Application No. PCT/EP2018/060809 dated Jun. 20, 2018.
Russian Search Report for Application No. 2019138316/11(075635) dated Aug. 25, 2020.
Japanese Search Report for Application No. 2020-507746 dated Sep. 4, 2020.
Japanese Search Report for Application No. 2019-558586 dated Sep. 7, 2020.
Japanese Office Action for Application No. 2019-558586 dated Sep. 29, 2020.
Japanese Office Action for Application No. 2020-507746 dated Sep. 29, 2020.
Russian Office Action for Application No. 2019138316/11(075635) dated Nov. 3, 2020.
European Office Action for U.S. Appl. No. 18719113 dated Nov. 20, 2020.
European Office Action for Application No. 18721349.1 dated Nov. 27, 2020.
Decision to Grant for Application No. 2019138316/11(075635) dated Feb. 3, 2021.
Non-Final Office Action for U.S. Appl. No. 16/664,197 dated Apr. 1, 2021.
Notice of Allowance for U.S. Appl. No. 16/664,197 dated Jul. 9, 2021.
European Office Action for Application No. 18719113 dated Jul. 12, 2021.
Corrected Notice of Allowability for U.S. Appl. No. 16/664,197 dated Aug. 4, 2021.

* cited by examiner

WING FOR AN AIRCRAFT

CROSS-REFERENCE TO RELATED APPLICATION

This application claims priority to German Patent Application No. 10 2019 108 285.4 filed Mar. 29, 2019, the entire disclosure of which is incorporated by reference herein.

TECHNICAL FIELD

The disclosure herein relates to a wing for an aircraft, comprising a main wing, a slat, and a connection assembly movably connecting the slat to the main wing, such that the slat is movable between a retracted position and at least one extended position. Further aspects of the disclosure herein relate to a guide rail as used in such a wing, and to an aircraft comprising such a wing or such a guide rail.

BACKGROUND

The connection assembly comprises an elongate slat track that extends along a track longitudinal axis between a front end and a rear end and has an intermediate portion between the front and rear ends. The front end of the slat track is preferably fixedly mounted to the slat, e.g. by two spherical bearings, both arranged with an offset in a wing profile plane across a wing span direction. The rear end and the intermediate portion of the slat track are movably mounted to the main wing by a roller bearing such that the slat track is movable along the track longitudinal axis, i.e. along a predefined path, preferably a circular path.

The roller bearing comprises a guide rail fixedly mounted to the main wing and a first roller unit mounted to the rear end of the slat track and engaging the guide rail. Preferably, the guide rail is formed, e.g. by a C-profile or by upper and lower H-profiles, such that its guide surfaces lie opposite the circumferential surface of the first roller unit, wherein the distance between an upper guide surface and a lower guide surface of the guide rail is larger than a diameter of the first roller unit, so that the first roller unit may engage only either the upper guide surface or the lower guide surface of the guide rail at the same time. I.e., the distance between upper and lower guide surfaces of the guide rail is selected such that a clearance is provided between the first roller unit and either the upper surface or the lower surface of the guide rail, so that the first roller unit cannot engage with the upper and lower guide surfaces of the guide rail at the same time and thereby block the first roller unit. Further preferably, the first roller unit has a first axis of rotation extending in parallel to a wing span direction, to a leading edge of main wing, or to a leading edge of the slat.

The roller bearing preferably further comprises a second roller unit that is fixedly mounted to the main wing and that engages an engagement surface provided at the intermediate portion of the slat track. Preferably, the second roller unit has a second axis of rotation extending in parallel to the first axis of rotation, to the wing span direction, to the leading edge of main wing, or to the leading edge of the slat.

Such wings are known in the art, for example from GB 404,149, where the connections assembly comprises a second roller unit composed of two roller elements engaging the slat track on opposite upper and lower surfaces.

SUMMARY

An object of the disclosure herein is to provide the wing with redundant main load paths.

This object is achieved in that the guide rail comprises a guide rail primary structure engaging with the first roller unit, and an additional reinforcement structure additionally reinforcing the guide rail primary structure in a lateral direction, i.e. perpendicular to the longitudinal axis of the slat track. The lateral direction is preferably parallel to a wing span direction, to the leading edge of main wing, or to the leading edge of the slat. The guide rail primary structure and the reinforcement structure are configured such that, with respect to the lateral direction, the guide rail primary structure forms a first main load path and the reinforcement structure forms a redundant second main load path capable of carrying the lateral loads in case of failure of the first main load path, i.e. of the guide rail primary structure. In such a way, the reinforcement structure provides additional hold to the guide rail primary structure in case of fracture of the guide rail primary structure (crack direction) along the longitudinal axis, i.e. in case of the guide rail primary structure separating in the lateral direction.

According to a preferred embodiment, the reinforcement structure comprises at least one reinforcement element extending in the lateral direction. Preferably, the at least one reinforcement element is in the form of a pin or a rod. Preferably two, most preferred four reinforcement elements are provided. However, also a higher number of reinforcement elements might be provided, such as six, eight or more. Such an at least one reinforcement element is specifically suitable for forming a redundant main load path and holding the guide rail primary structure in place in case of fracture of the guide rail primary structure.

In particular, it is preferred that the guide rail primary structure comprises an upper guide surface engaging with the first roller unit from above, an opposite lower guide surface engaging with the first roller unit from below, at least one first side wall at a first lateral side and at least one second side wall at an opposite second lateral side of the upper and lower guide surfaces. Preferably, the upper guide surface and the lower guide surface extend in parallel to one another and to the lateral direction, while the first side wall and the second side wall extend perpendicular to the upper and lower guide surfaces and limit lateral movement of the first roller unit between the first and second side walls. Preferably, at least one reinforcement element couples and retains the first side wall to the second side wall, thereby holding the first and second side walls together when the upper guide surface and/or the lower guide surface fails, in particular fractures in a direction along the longitudinal axis of the slat track. Preferably, the at least one reinforcement element is mounted to and preferably extends through the first and second side walls. However, it might also be indirectly coupled to the first and second side walls e.g. via lugs or load transfer plates. The first and second side walls are particularly suitable for transferring loads to the reinforcement pin.

It is further preferred that the guide rail primary structure comprises an upper structure component and a lower structure component formed separate from one another. The upper structure component includes the upper guide surface, a first upper side wall at the first lateral side, and a second upper side wall at the second lateral side. The lower structure component includes the lower guide surface, a first lower side wall at the first lateral side, and a second lower side wall at the second lateral side. At least one upper reinforcement element couples and retains the first upper side wall to the second upper side wall, and/or at least one lower reinforcement element couples and retains the first lower side wall to the second lower side wall. In such a way, each of the upper guide surface and the lower guide surface has its own reinforcement element forming a redundant load path.

It is further preferred that a front upper reinforcement element couples and retains the first upper side wall to the second upper side wall at a front end of the upper structure component, when viewed along the longitudinal axis of the slat track. Preferably, a front lower reinforcement element couples and retains the first lower side wall to the second lower side wall at the front end of the lower structure component, when viewed along the longitudinal axis of the slat track. In such a way, the guide rail primary structure is reinforced at the position where the highest loads during operation of the associated aircraft occur, which is usually in a front position when the slat is extended.

Additionally, it is preferred that a rear upper reinforcement element couples and retains the first upper side wall to the second upper side wall at a rear end of the upper structure component, when viewed along the longitudinal axis of the slat track. Preferably, a rear lower reinforcement element couples and retains the first lower side wall to the second lower side wall at a rear end of the lower structure component, when viewed along the longitudinal axis of the slat track. In such a way, the guide rail primary structure is reinforced at four positions, namely at its front, rear, upper and lower portions so that a homogeneous reinforcement is provided.

According to a preferred embodiment, at least one reinforcement element is mounted to a first rib of the main wing at the first lateral side and to a second rib of the main wing at the second lateral side. Both the first rib and the second rib extend in parallel chord planes. In such a way, the reinforcement element couples the guide rail to the ribs and thus to the main wing.

Additionally or alternatively, it is preferred that a first load transfer plate is mounted to a lateral side of the first side wall in an abutting manner. Further, a second load transfer plate is mounted to a lateral side of the second side wall in an abutting manner. At least one reinforcement element is mounted to the first and second load transfer plates. In such a way, the first and second load transfer plates transfer and distribute the loads between the reinforcement element and the first and second side walls of the guide rail primary structure in case fracture of the guide rail primary structure occurs where the reinforcement element is mounted to the first and/or second side wall.

In particular, it is preferred that the first load transfer plate is mounted to the first rib of the main wing at the first lateral side and to the second rib of the main wing at the second lateral side. In such a way, the whole guide rail can be installed between the first and second ribs as one package of guide rail primary structure, reinforcement element(s) and load transfer plates and can be mounted to the ribs and thus to the main wing by via the load transfer plates.

According to a preferred embodiment, the slat track has a profile, i.e. a cross section across the longitudinal axis, comprising an upper flange portion, a lower flange portion and at least one web portion connecting upper and lower flange portions. Such a profile might be e.g. a C-profile, a double-C-profile, an I-profile, an H-profile, or a Π-profile. The second roller unit is arranged in a recess between upper and lower flange portions and engages the engagement surface provided at the upper flange portion and/or at the lower flange portion, preferably either the upper flange portion or the lower flange portion or both flange portions in a successive manner. In such a way, the second roller unit does not occupy the space above and below the slat track, and the slat track can be held with only a single roller element. This simplifies the connection assembly, saves space and weight, and thus increases efficiency of the wing. Further, the connection assembly can be formed such that it is arranged entirely in front of the front spar of the associated wing and does not penetrate the front spar.

According to a preferred embodiment, the slat track has such a profile, in particular an I-profile or double-C-profile, that a first recess is formed between the upper and lower flange portions at a first side of the web portion, and a second recess is formed between the upper and lower flange portions at a second side of the web portion opposite the first side. In such a way, two roller elements can be received in both recesses.

In particular, it is preferred that the second roller unit comprises a first roller element and a second roller element. The first roller element is arranged in the first recess and the second roller element is arranged in the second recess. First and second roller elements are arranged coaxially, i.e. both rotating about the second axis of rotation, and have the same radius. By the first and second roller element higher loads can be absorbed and a symmetric arrangement or an arrangement with two separate load paths is enabled.

Further, it is preferred that the web portion of the slat track comprises a slot extending from the first side to the second side of the web portion and extending elongated along the track longitudinal axis. Preferably, the slot extends along the track longitudinal axis at least as long as the distance by which the slat is moved between the retracted and a fully extended position. The first roller element and the second roller element are mounted on one common shaft for common rotation. The common shaft proceeds through the slot from the first side to the second side of the web portion. Preferably, opposite ends of the common shaft are supported at the main wing. By using one common shaft to support first and second roller elements bending loads introduced in the main wing structure are minimized.

According to an alternative embodiment, the first roller element is mounted on a first shaft and the second roller element is mounted on a second shaft separate from the first shaft. Preferably, first and second shafts are independently supported at the main wing. By using separate shafts to support first and second roller elements no slot through the slat track is required.

According to a preferred embodiment, the first roller unit comprises a single third roller element, preferably mounted to the slat track by a yoke-shaped rear end of the slat track that holds the third roller element from opposite sides. Using only a single third roller element represents a very simple design.

In an alternative embodiment, the first roller unit comprises a third roller element and a fourth roller element. Third and fourth roller elements are arranged coaxially, i.e. both rotating about the first axis of rotation, and have the same radius. Preferably, the third roller element is arranged at the first side and the fourth roller element is arranged at the second side of the web portion. In such a way, a backup roller element is provided.

According to a preferred embodiment, the slat track comprises a first track part and a second track part that are formed separate from one another. Each of the first and second track parts is formed integrally and extends along the track longitudinal axis from the rear end to the front end. The first and second track parts are mounted to one another, e.g. by bolts, and rest against one another along a contact plane spanned by the track longitudinal axis and a wing thickness direction, which might be a vertical symmetry plane, preferably along the entire longitudinal extension. By the first and second track part two separate load paths are introduced which might be designed as redundant load paths such that when one load path fails the other load path is still capable of carrying the occurring air loads applied via the slat.

In particular, it is preferred that the third roller element is mounted to both the first track part and the second track part. In such a way, in case of failure of one of the first and second track parts the third roller element would still be sufficiently supported by the other one of the first and second track parts, so that this track part would still be guided by the third roller element.

Alternatively, it is preferred that the third roller element is mounted to the first track part and the fourth roller element is mounted to the second track part. In such a way, in case of failure of one of the first and second track portions the other one of the first and second track portions would still be guided by the associated one of the third and fourth rollers.

According to a preferred embodiment, the distance between the upper flange portion and the lower flange portion of the slat track is larger than a diameter of the second roller unit, such that a clearance is provided either between the second roller unit and the engagement surface at the upper flange portion, or between the second roller unit and the engagement surface at the lower flange portion.

According to yet a further preferred embodiment, the connection assembly is a first connection assembly. The wing comprises a second connection assembly connecting the slat to the main wing in a position spaces apart from the first connection assembly in a wing span direction. The second connection assembly is formed as the first connection assembly, i.e. has the same features as the first connection assembly. Alternatively, the second connections assembly might also be formed different from the first connection assembly.

A further aspect of the disclosure herein relates to a guide rail for being used in a roller bearing of a wing for an aircraft, in particular to a guide rail for being used in the afore-described wing. The guide rail is configured for being mounted to a main wing and for being engaged by a first roller unit mounted to a rear end of a slat track. The guide rail comprises a guide rail primary structure configured to engage with the first roller unit, and an additional reinforcement structure additionally reinforcing the guide rail primary structure in a lateral direction. The guide rail primary structure forms a first main load path and the reinforcement structure forms a redundant second main load path. The features and advantages mentioned above in connection with the wing apply vis-à-vis for the guide rail.

A yet further aspect of the disclosure herein relates to an aircraft comprising a wing according to any of the afore-described embodiments or comprising a guide rail according to any of the afore-described embodiments. The features and advantages mentioned in connection with the wing and the guide rail apply vis-à-vis for the aircraft.

BRIEF DESCRIPTION OF THE DRAWINGS

Hereinafter, preferred embodiments of the disclosure herein are explained in more detail by a drawing. The drawing shows in.

DETAILED DESCRIPTION

Figure 1:
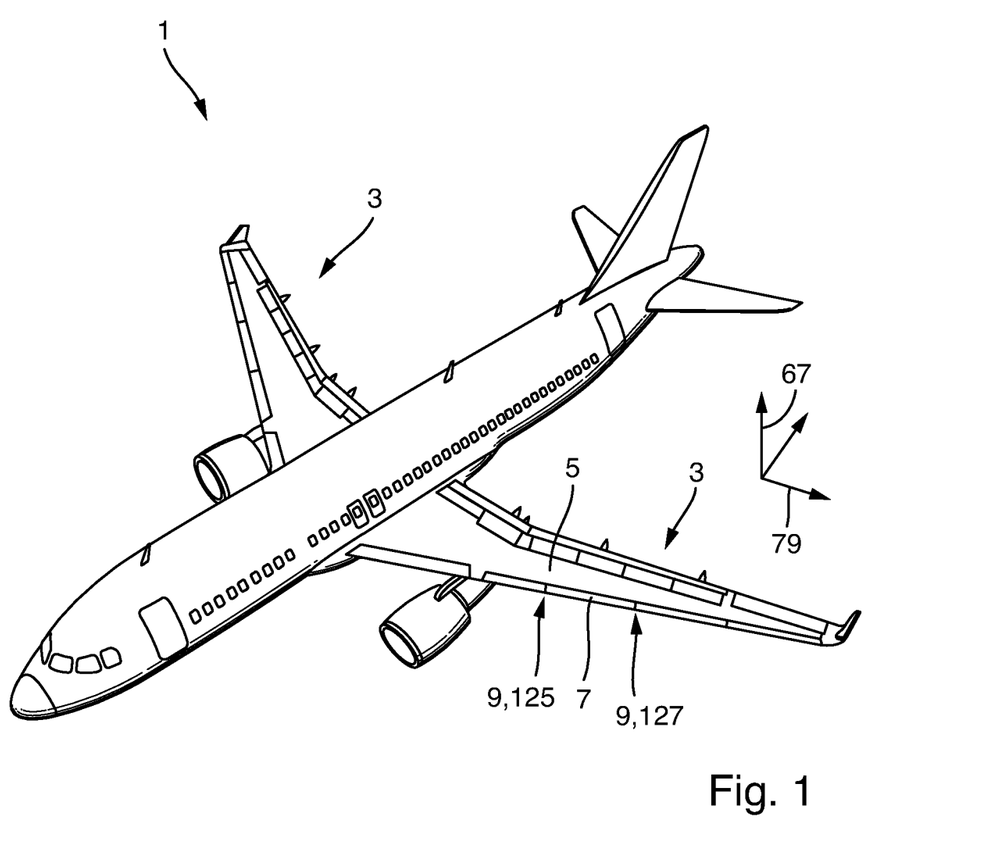
FIG. 1 a perspective view of an aircraft according to the disclosure herein, including a wing.

In FIG. 1 an aircraft 1 according to an embodiment of the disclosure herein is illustrated. The aircraft 1 comprises a wing 3 that is formed according to an embodiment of the disclosure herein.

Figure 2:
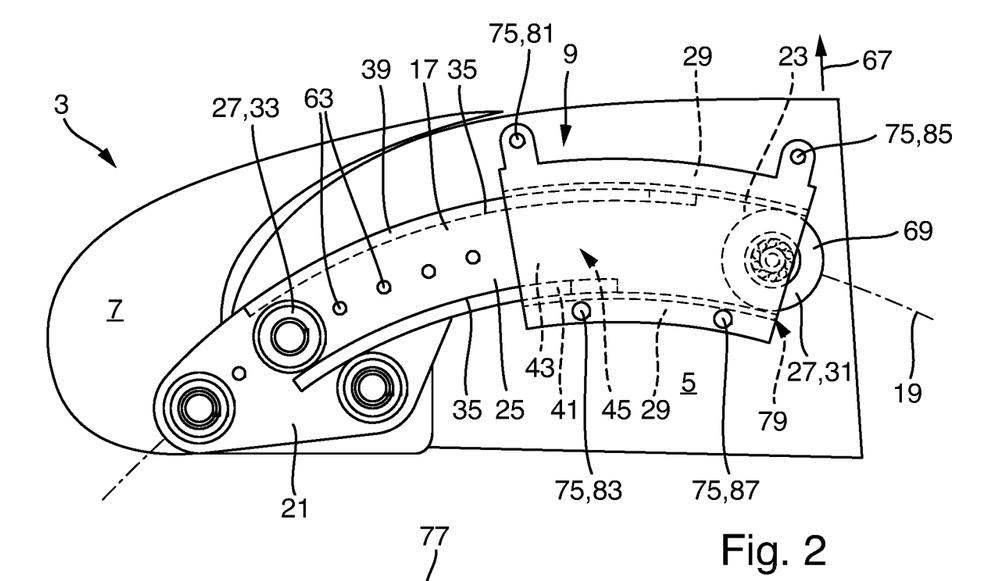
FIG. 2 a cross sectional view of the wing shown in FIG. 1, including a connection assembly.

FIG. 2 shows the wing 3 from FIG. 1 in more detail. The wing 1 comprises a main wing 5, a slat 7, and a connection assembly 9 movably connecting the slat 7 to the main wing 5, such that the slat 7 is movable between a retracted position and at least one extended position.

Figure 3:
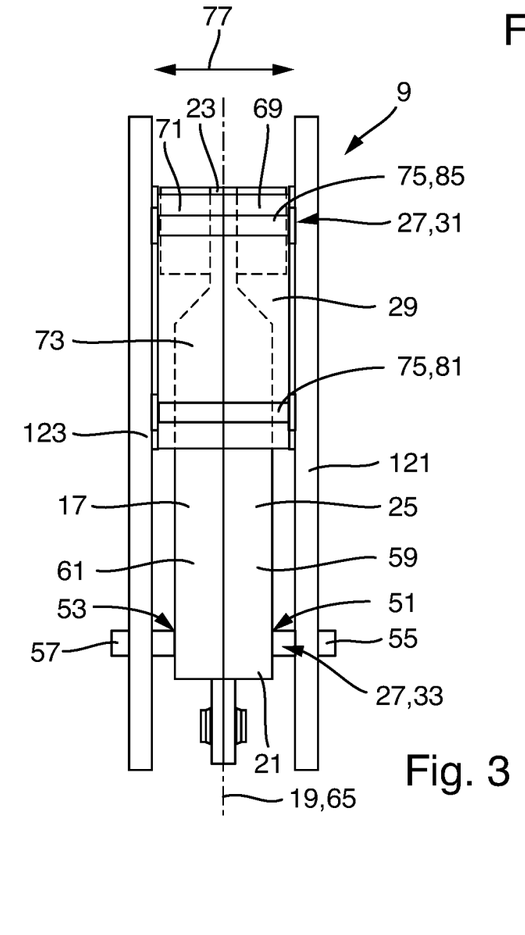
FIG. 3 a top view of the connection assembly shown in FIG. 2.
Figure 4:
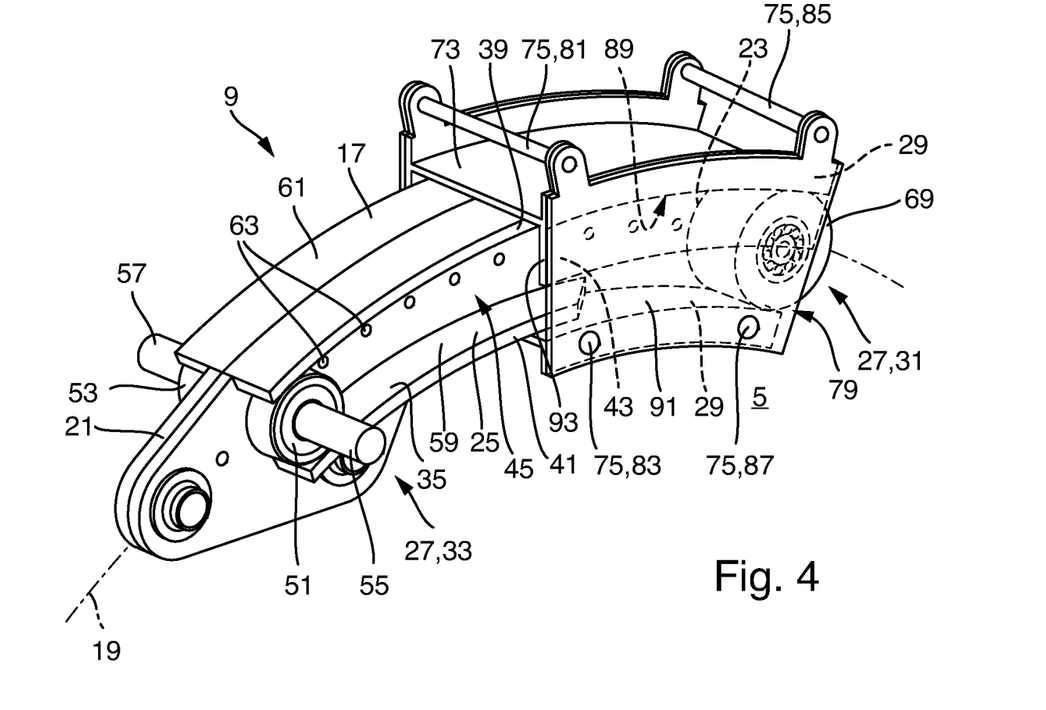
FIG. 4 a perspective view of the connection assembly shown in FIG. 2.
Figure 5:
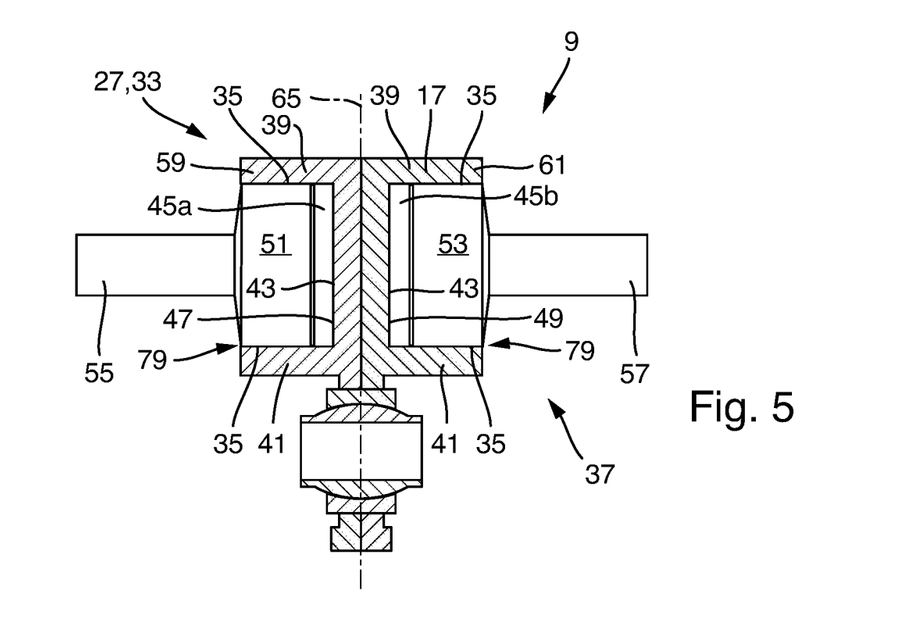
FIG. 5 a cross sectional view across the track longitudinal axis of the connection assembly shown in FIG. 2.

The connection assembly 9 comprises an elongate slat track 17 that extends along a track longitudinal axis 19 between a front end 21 and a rear end 23 and has an intermediate portion 25 between the front and rear ends 21, 23. The front end 21 of the slat track 17 is fixedly mounted to the slat 7. The rear end 23 and the intermediate portion 25 of the slat track 17 are movably mounted to the main wing 5 by a roller bearing 27 such that the slat track 17 is movable along the track longitudinal axis 19. The roller bearing 27 comprises a guide rail 29 fixedly mounted to the main wing 5 and a first roller unit 31 fixedly mounted to the rear end 23 of the slat track 17 and engaging the guide rail 29. The roller bearing 27 comprises a second roller unit 33 that is fixedly mounted to the main wing 5 and that engages an engagement surface 35 provided at the intermediate portion 25 of the slat track 17. As shown in FIGS. 3, 4, and 5, the slat track 17 has a double-C-shaped profile 37 comprising an upper flange portion 39, a lower flange portion 41 and at least one web portion 43 connecting upper and lower flange portions 39, 41. The second roller unit 33 is arranged in a recess 45 between upper and lower flange portions 39, 41 and engages the engagement surface 35 provided at the upper flange portion 39 and at the lower flange portion 41.

As shown in FIGS. 4 and 5, the double-C-shaped profile 37 of the slat track 17 provides that a first recess 45a is formed between the upper and lower flange portions 39, 41 at a first side 47 of the web portion 43, and a second recess 45b is formed between the upper and lower flange portions 39, 41 at a second side 49 of the web portion 43 opposite the first side 47. The second roller unit 33 comprises a first roller element 51 and a second roller element 53. The first roller element 51 is arranged in the first recess 45a and the second roller element 53 is arranged in the second recess 45b. First and second roller elements 51, 53 are arranged coaxially and have the same radius. The first roller element 51 is mounted on a first shaft 55 and the second roller element 53 is mounted on a second shaft 57 separate from the first shaft 55. First and second shafts 55, 57 are supported at the main wing 5.

FIGS. 3, 4 and 5 show that the slat track 17 comprises a first track part 59 and a second track part 61 that are formed separate from one another. Each of the first and second track parts 59, 61 is formed integrally and extends along the track longitudinal axis 19 from the rear end 23 to the front end 21. The first and second track parts 59, 61 are mounted to one another by bolts 63 and rest against one another along a contact plane 65 spanned by the track longitudinal axis 19 and a wing thickness direction 67. As visible in FIG. 3, the first roller unit 31 comprises a third roller element 69 and a fourth roller element 71. Third and fourth roller elements 69, 71 are arranged coaxially and have the same radius. The third roller element 69 is mounted to the first track part 59 and the fourth roller element 71 is mounted to the second track part 61. Alternatively, the first roller unit 31 might also comprise only a single third roller element 69.

Figure 6:
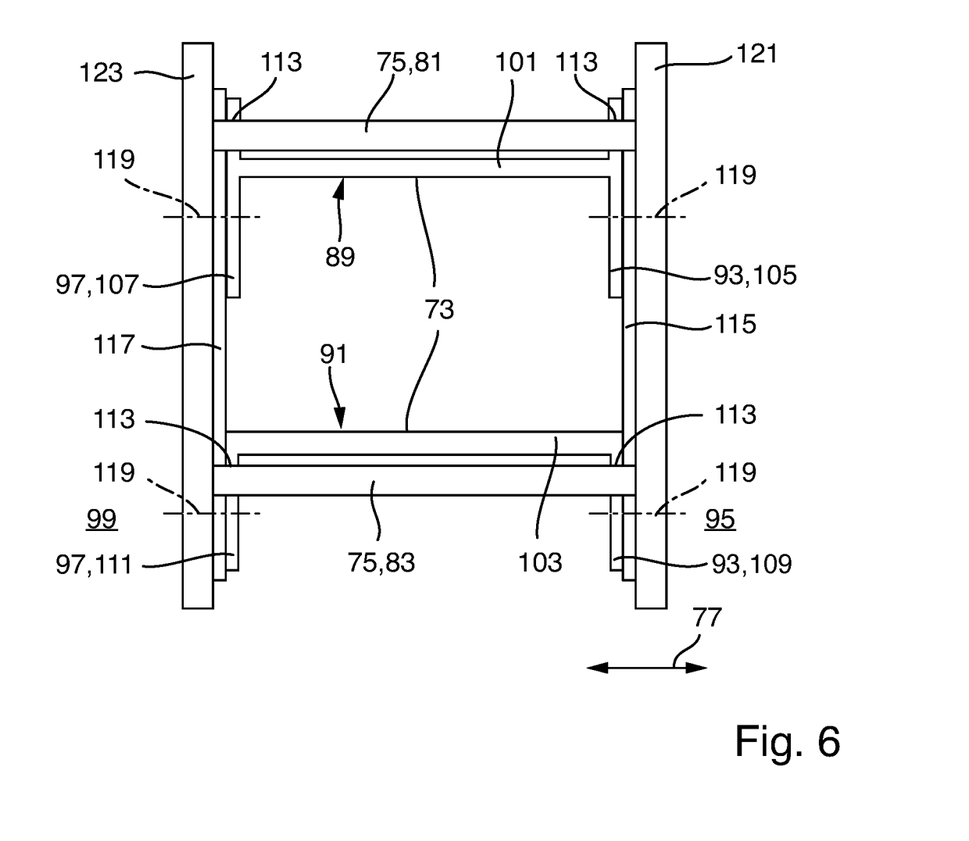
FIG. 6 a cross sectional view across the track longitudinal axis of a first embodiment of the guide rail isolated from the slat track.
Figure 7:
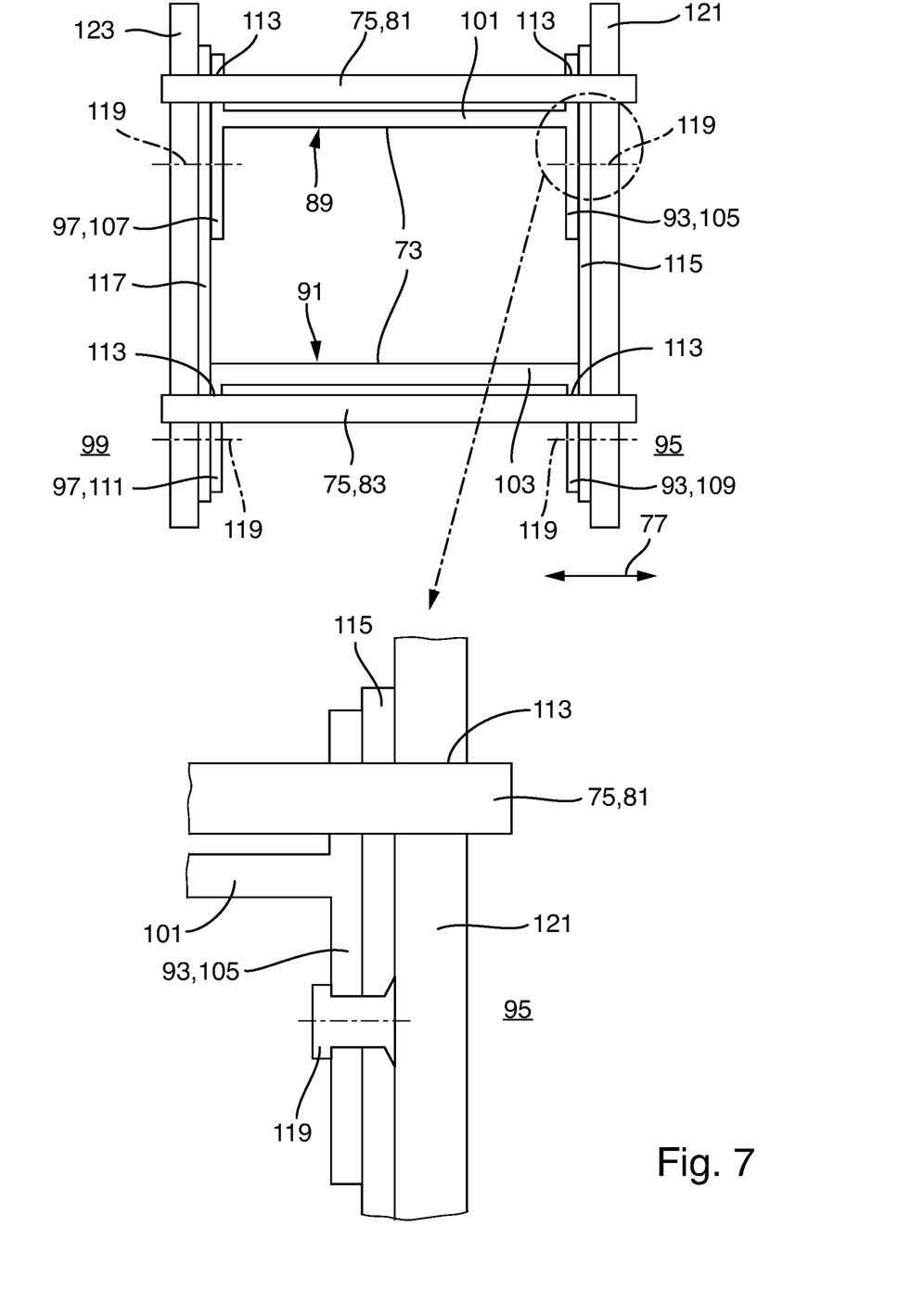
FIG. 7 a cross sectional view across the track longitudinal axis of a second embodiment of the guide rail isolated from the slat track.

FIGS. 6 and 7 show two embodiments of the guide rail isolated from the slat track. In both cases, the guide rail 29 comprises a guide rail primary structure 73 engaging with the first roller unit 31, and an additional reinforcement structure 75 additionally reinforcing the guide rail primary structure 73 in a lateral direction 77, i.e. perpendicular to the track longitudinal axis 19. The lateral direction 77 is preferably parallel to a wing span direction 79, to a leading edge of main wing 5, or to a leading edge of the slat 7. The guide rail primary structure 73 and the reinforcement structure 75 are configured such that, with respect to the lateral direction 77, the guide rail primary structure 73 forms a first main load path and the reinforcement structure 75 forms a redundant second main load path capable of carrying the lateral loads in case of failure of the first main load path. The reinforcement structure 75 comprises four reinforcement elements 81, 83, 85, 87 in the form of pins extending in the lateral direction 77.

As shown in FIGS. 6 and 7, the guide rail primary structure 73 comprises an upper guide surface 89 engaging with the first roller unit 31 from above and an opposite lower guide surface 91 engaging with the first roller unit 31 from below. Further, the guide rail primary structure 73 comprises a first side wall 93 at a first lateral side 95 and a second side wall 97 at an opposite second lateral side 99 of the upper and lower guide surfaces. The upper guide surface 89 and the lower guide surface 91 extend in parallel to one another and to the lateral direction 77, while the first side wall 93 and the second side wall 97 extend perpendicular to the upper and lower guide surfaces 89, 91. Specifically, the guide rail primary structure 73 is formed of an upper structure component 101 and a lower structure component 103 separate from the upper structure component 101. The upper structure component 101 includes the upper guide surface 89, a first upper side wall 105 at the first lateral side 95, and a second upper side wall 107 at the second lateral side 99. The lower structure component 103 includes the lower guide surface 91, a first lower side wall 109 at the first lateral side 95, and a second lower side wall 111 at the second lateral side 99. The first upper and lower side walls 105, 109 form the first side wall 93 and the second upper and lower side walls 107, 111 form the second side wall 97.

The reinforcement elements 81, 83, 85, 87 couple the first side wall 93 to the second side wall 97, thereby holding the first and second side walls 93, 97 together when the upper guide surface 89 and/or the lower guide surface 91 fail. The reinforcement elements 81, 83, 85, 87 are mounted to the first and second side walls 93, 97 while extending through respective bores 113 in the first and second side walls 93, 97. Specifically, a front upper reinforcement element 81 couples the first upper side wall 105 to the second upper side wall 107 at a front end of the upper structure component 101. A front lower reinforcement element 83 couples the first lower side wall 109 to the second lower side wall 111 at a front end of the lower structure component 103. A rear upper reinforcement element 85 couples the first upper side wall 105 to the second upper side wall 107 at a rear end of the upper structure component 101. A rear lower reinforcement element 87 couples the first lower side wall 109 to the second lower side wall 111 at a rear end of the lower structure component 103.

As shown in FIGS. 6 and 7, the reinforcement structure 75 further comprises a first load transfer plate 115 and a second load transfer plate 117. The first load transfer plate 115 is mounted to a lateral side of the first side wall 93 in an abutting manner by rivets 119. Likewise, the second load transfer plate 117 is mounted to a lateral side of the second side wall 97 in an abutting manner by rivets 119. The reinforcement elements 81, 83, 85, 87 are mounted to the first and second load transfer plates 115, 117 while extending through respective bores 113 in the first and second load transfer plates 115, 117.

In the embodiment shown in FIG. 6, the first load transfer plate 115 is mounted to a first rib 121 of the main wing 5 at the first lateral side 95 and to a second rib 123 of the main wing 5 at the second lateral side 99 by rivets 119. Both the first rib 121 and the second rib 123 extend in parallel chord planes. The rivets 119 extend all the way through the first rib 121, the abutting first load transfer plate 115 and the abutting first side wall 93, and extend all the way through the second rib 123, the abutting second load transfer plate 117 and the abutting second side wall 97, respectively.

In contrast, in the embodiment shown in FIG. 7, only the first side wall 93 and the first load transfer plate 115 are mounted together by rivets 119. Instead, the reinforcement elements 81, 83, 85, 87 are responsible for mounting the guide rail primary structure 73 and the load transfer plates 115, 117 to the ribs 121, 123 by extending all the way through respective bores 113 in the first side wall 93, the abutting first load transfer plate 115 and the abutting first rib 121, and all the way through respective bores 113 in the second side wall 97, the abutting second load transfer plate 117 and the abutting second rib 123, respectively.

As shown in FIG. 1, the connection assembly 9 is a first connection assembly 125, and the wing 3 comprises a second connection assembly 127 connecting the slat 7 to the main wing 5 in a position spaced apart from the first connection assembly 125 in the wing span direction 79, and wherein the second connection assembly 127 is formed as the first connection assembly 125.

While at least one example embodiment of the invention (s) herein is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. A wing for an aircraft, comprising:
a main wing;
a slat;
a connection assembly movably connecting the slat to the main wing, such that the slat is movable between a retracted position and at least one extended position, the connection assembly comprising an elongate slat track that extends along a track longitudinal axis between a front end and a rear end and has an intermediate portion between the front and rear ends, wherein the front end of the slat track is mounted to the slat; and a roller bearing comprising a guide rail, which is fixedly mounted to the main wing, and a first roller unit, which is mounted to the rear end of the slat track and engages the guide rail, wherein the rear end and the intermediate portion of the slat track are movably mounted to the main wing by the roller bearing, such that the slat track is movable along the track longitudinal axis;

wherein the guide rail comprises a guide rail primary structure, which engages with the first roller unit, and a reinforcement structure, which reinforces the guide rail primary structure in a lateral direction; and wherein the guide rail primary structure forms a first main load path and the reinforcement structure forms a second main load path, which is redundant to the first main load path.

2. The wing of claim 1, wherein the reinforcement structure comprises at least one reinforcement element extending in the lateral direction.

3. The wing of claim 2, wherein the guide rail primary structure comprises an upper guide surface engaging with the first roller unit from above, an opposite lower guide surface engaging with the first roller unit from below, and at least one first side wall at a first lateral side and at least one second side wall at an opposite second lateral side of the upper and lower guide surfaces, wherein the at least one reinforcement element couples the first side wall to the second side wall.

4. The wing of claim 3, wherein the guide rail primary structure comprises an upper structure component and a lower structure component, wherein the upper structure component includes the upper guide surface, a first upper side wall at the first lateral side, and a second upper side wall at the second lateral side, wherein the lower structure component includes the lower guide surface, a first lower side wall at the first lateral side, and a second lower side wall at the second lateral side, and wherein the at least one reinforcement element comprises at least one upper reinforcement element, which couples the first upper side wall to the second upper side wall, and/or the at least one reinforcement element comprises at least one lower reinforcement element couples the first lower side wall to the second lower side wall.

5. The wing of claim 4, wherein the at least one upper reinforcement element comprises a front upper reinforcement element, which couples the first upper side wall to the second upper side wall at a front end of the upper structure component, and wherein the at least one lower reinforcement element comprises a front lower reinforcement element, which couples the first lower side wall to the second lower side wall at a front end of the lower structure component.

6. The wing of claim 5, wherein the at least one upper reinforcement element comprises a rear upper reinforcement element, which couples the first upper side wall to the second upper side wall at a rear end of the upper structure component, and wherein the at least one lower reinforcement element comprises a rear lower reinforcement element, which couples the first lower side wall to the second lower side wall at a rear end of the lower structure component.

7. The wing of claim 6, wherein at least one reinforcement element is mounted to a first rib of the main wing at the first lateral side and to a second rib of the main wing at the second lateral side.

8. The wing of claim 7, wherein a first load transfer plate is mounted to a lateral side of the first side wall, wherein a second load transfer plate is mounted to a lateral side of the second side wall, and wherein at least one reinforcement element is mounted to the first and second load transfer plates.

9. The wing of claim 8, wherein the first load transfer plate is mounted to the first rib of the main wing at the first lateral side and to the second rib of the main wing at the second lateral side.

10. An aircraft comprising the wing of claim 1.

11. A guide rail for use in a roller bearing of a wing for an aircraft, the guide rail comprising:

a guide rail primary structure for engaging with a first roller unit, which is mounted to a rear end of a slat track; and a reinforcement structure for reinforcing the guide rail primary structure in a lateral direction;

wherein the guide rail is for fixedly mounting to a main wing; and wherein the guide rail primary structure forms a first main load path and the reinforcement structure forms a second main load path, which is redundant to the first main load path.

12. An aircraft comprising the guide rail of claim 11.

* * * * *